United States Patent
Chester et al.

(10) Patent No.: US 11,294,733 B2
(45) Date of Patent: Apr. 5, 2022

(54) DYNAMIC AUTOSCALER FOR CLOUD PLATFORM

(71) Applicant: Pivotal Software, Inc., San Francisco, CA (US)

(72) Inventors: Jacques Chester, New York, NY (US); John Feminella, Charlottesville, VA (US)

(73) Assignee: Pivotal Software, Inc., Palo Alto, CA (US)

( * ) Notice: Subject to any disclaimer, the term of this patent is extended or adjusted under 35 U.S.C. 154(b) by 120 days.

(21) Appl. No.: 16/569,603

(22) Filed: Sep. 12, 2019

(65) Prior Publication Data
US 2021/0173719 A1    Jun. 10, 2021

(51) Int. Cl.
  *G06F 9/50* (2006.01)
  *G06F 9/455* (2018.01)
  (Continued)

(52) U.S. Cl.
  CPC ............ *G06F 9/5083* (2013.01); *G06F 9/455* (2013.01); *G06F 9/45533* (2013.01); *G06F 9/45558* (2013.01); *G06F 9/48* (2013.01); *G06F 9/4881* (2013.01); *G06F 9/50* (2013.01); *G06F 9/5005* (2013.01); *G06F 9/505* (2013.01);
  (Continued)

(58) Field of Classification Search
  CPC .. G06F 9/455; G06F 9/45533; G06F 9/45558; G06F 2009/45583; G06F 9/48; G06F 9/4881; G06F 9/50; G06F 9/5005; G06F 9/5011; G06F 9/5016; G06F 9/5022; G06F 9/5027; G06F 9/505; G06F 9/5061;
  (Continued)

(56) References Cited

U.S. PATENT DOCUMENTS

| 9,329,904 | B2 | 5/2016 | Wray et al. |
| 10,748,161 | B1 * | 8/2020 | Norbeck, Jr. ......... H04L 41/082 |

(Continued)

OTHER PUBLICATIONS

Rahman et al, "Auto-Scaling VNFs using Machine Learning to Improve QoS and Reduce Cost", 2018 IEEE International Conference on Communications (ICC), May 20-24, 2018, pp. 1-6 (Year: 2018).*

Cachon et al., "Matching Supply with Demand: An Introduction to Operations Management," McGraw Hill, 3rd Ed., Feb. 2012, 507 pages.

(Continued)

*Primary Examiner* — Charles M Swift
(74) *Attorney, Agent, or Firm* — Fish & Richardson P.C.

(57) ABSTRACT

Methods, systems, and apparatus, including computer programs encoded on computer storage media, for performing autoscaling of computing resources in a distributed computing system. One of the methods includes receiving, by an autoscaler of a cloud computing platform, a plurality of capacity parameters for a workload that is to be executed in one or more instances of the cloud computing platform or to consume some amount of computing resources. An autoscaling process is repeatedly performed that computes a capacity cost for a workload based on a current utilization measure for multiple workloads of the cloud computing platform. A target capacity level is computed that quantifies the amount of computing resources that should be allocated to the workload to achieve the target service level for the computed demand forecast, resource allocation is automatically adjusted for the workload according to the target capacity level.

20 Claims, 6 Drawing Sheets

(51) Int. Cl.
*G06F 9/48* (2006.01)
*G06F 11/30* (2006.01)

(52) U.S. Cl.
CPC .......... *G06F 9/5011* (2013.01); *G06F 9/5016* (2013.01); *G06F 9/5022* (2013.01); *G06F 9/5027* (2013.01); *G06F 9/5061* (2013.01); *G06F 9/5072* (2013.01); *G06F 11/30* (2013.01); *G06F 2009/45583* (2013.01)

(58) Field of Classification Search
CPC .... G06F 9/5072; G06F 9/5077; G06F 9/5083; G06F 11/30
See application file for complete search history.

(56) References Cited

U.S. PATENT DOCUMENTS

| | | | |
|---|---|---|---|
| 2009/0016220 A1* | 1/2009 | Uysal | H04L 41/5096 370/232 |
| 2012/0030685 A1* | 2/2012 | Jackson | G06F 9/5072 718/104 |
| 2012/0239525 A1* | 9/2012 | Zeng | G06Q 30/00 705/26.8 |
| 2013/0268940 A1* | 10/2013 | Gmach | G06F 9/5077 718/104 |
| 2014/0331222 A1* | 11/2014 | Zheng | G06F 9/5077 718/1 |
| 2016/0162320 A1* | 6/2016 | Singh | G06F 9/45558 718/1 |
| 2019/0056969 A1* | 2/2019 | Khandros | G06F 16/258 |
| 2019/0102717 A1* | 4/2019 | Wu | G06Q 10/06375 |
| 2019/0171483 A1* | 6/2019 | Santhar | G06N 20/00 |
| 2019/0179679 A1* | 6/2019 | Dimnaku | G06F 9/4806 |
| 2020/0287794 A1 | 9/2020 | Ratogi et al. | |

OTHER PUBLICATIONS

Bogle et al., "TeaVaR: Striking the Right Utilization—Availability Balance in WAN Traffic Engineering," SIGCOMM '19, Beijing, China, Aug. 19-23, 2019, 15 pages.

Github.com [online], "Modified proposal for configurable HPA to use a single field to specify allowed changes," Comment by reviewer josephburnett on Sep. 13, 2019, [retrieved on Nov. 21, 2019], retrieved from: URL <https://github.com/kubernetes/enhancements/pull/1234#discussion_r324160798>, 7 pages.

Kubernetes.io [online], "Horizontal Pod Autoscaler," Kubernetes Tasks: Run Applications, available on or before Oct. 11, 2019, retrieved from: URL <https://kubernetes.io/docs/tasks/run-application/horizontal-pod-autoscale/>, 9 pages.

Nguyen et al., "Real-time Serverless: Enabling Application Performance Guarantee," presented at the Fifth International Workshop on Serverless Computing (WoSC), UC Davis California, USA, Dec. 9, 2019, 34 pages.

Nguyen, "Cloud Resource Management for Bursty, Real-Time Workloads," A Dissertation submitted to the Faculty of the Division of the Physical Science in Candidacy for the Degree of Master, The University of Chicago, Jul. 2019.

Turbonomic.com [online], "Application Resource Management," Turbonomic Platform Product Page, available on or before Oct. 11, 2019, retrieved from: URL <https://turbonomic.com/product/>, 3 pages.

Virtustream.com [online], "Virtustream μVM Resource Management," Virtustream Software Overview, available on or before Oct. 11, 2019, retrieved from: URL <https://www.virtustream.com/software/micro-vms>, 5 pages.

Zhou et al., "Overload Control for Scaling WeChat Microservices," SoCC '18, Carlsbad, CA, USA, Oct. 2018, updated Dec. 18, 2018, 13 pages.

* cited by examiner

DYNAMIC AUTOSCALER FOR CLOUD PLATFORM

BACKGROUND

This specification relates to efficient utilization of computing resources, and more particularly to cloud platforms and cloud-based autoscalers.

A cloud application platform is a platform-as-a-service ("PaaS") cloud computing system that allows users to deploy and manage multiple instances of network-accessible applications, which for brevity will also be referred to as simply applications or, when additional context is required, platform applications. The applications are executed by hardware of an underlying cloud computing infrastructure, which may or may not be provided by a different entity, e.g., an entity providing an infrastructure-as-a-service ("IaaS") platform. Related categories of systems include functions-as-a-service ("FaaS") platforms, which allow instances to be scaled down to zero instances and containers-as-a-service ("CaaS") platforms, which manage containers and container images instead of managing applications, functions or infrastructure. The cloud application platform can handle provisioning of resources in the underlying cloud computing infrastructure as well as staging and launching of applications using the provisioned resources. Therefore, developers who use the cloud application platform need not spend time building or configuring the hardware, software or networking of a cloud computing system. Rather, the developers can focus on the application development itself, and rely on the services provided by the cloud application platform to launch and manage instances of the application. After being launched, the application instances can be used by end users over a network, e.g., the Internet.

Some cloud systems provide amounts or shares of shared resources, instead of instances of an application, function, container or other discrete computing process. For example, disk space or disk TOPS may be utilized by end-users and developers in various ways to enable applications, functions, containers and other discrete processes to achieve their purpose. Many kinds of computing resource can be partitioned or subdivided and those partitions or divisions can be allocated for the exclusive use of some consumer or group of consumers, whether end-users or software.

Cloud-based autoscalers are system components that automatically scale up and scale down resources in a cloud computing system. For example, when demand for a particular application increases, an autoscaler can provision more computing resources, e.g., virtual machines, containers, disks, and network resources, to handle the increased demand. An autoscaler can also automatically scale up the number of instances of the application that are running on the platform. Similarly, an autoscaler can also adjust quotas, resource allocations or other work-limiting or Quality of Service mechanisms. For example, an autoscaler might assign more disk space when a database's tables grow larger, or decrease network throughput for applications with small and infrequent traffic.

Conventional autoscalers typically come in one of two varieties: predictive or reactive. A predictive autoscaler uses historical data to make predictions about demand for resources in the future. The predictions can then be used to generate a schedule for when resources should be scaled up or scaled down. One drawback of predictive autoscalers is that the schedule can be inaccurate and may incorrectly account for unanticipated demands. This leads to system inefficiencies and wasted computing resource utilization.

On the other hand, a reactive autoscaler uses current platform conditions to make small time-window decisions about how to scale up or scale down resources. Recalculations might take seconds or minutes, and it may take the platform seconds or minutes to react to the recalculations. One drawback of reactive autoscalers is that overall system resource utilization is unpredictable. If demand spikes and the reactive autoscaler increases capacity in response to the demand spike, resource utilization of the system also spikes in a way that cannot be predicted beforehand.

Both types of autoscalers also make it difficult or impossible for users to express the importance of their various workloads running on a cloud computing platform. In other words, when demands for computing resources change, users often do not want their workloads to scale uniformly. Rather, users may want some workloads to scale up but other workloads to remain the same or scale down, depending on current computing conditions.

In addition, predictive and reactive autoscalers will typically assume that capacity is unbounded, or bounded, without being able to deal with either condition as they arise. Autoscalers assuming unbounded capacity will set capacity targets that will not or cannot be honored by the underlying cloud platform. Examples include reaching account quotas or that the provider itself is at its own capacity limits. In such situations a normal autoscaler may set increasingly high targets ("panic") in order to "catch up" with the shortfall in capacity, without adjusting its targets to account for the change from an unbounded to a bounded capacity regime. Autoscalers assuming bounded regimes will show an opposite problem, which is that they will fail to exploit capacity that has become relatively cheap, because such capacity lies outside its implicit or explicit capacity bounds. Taken together, these two problems show that predictive and reactive autoscalers cannot provide any signal or "backpressure" to the workload, but instead simply make a best effort to fulfill demand. This means that the effect of insufficient capacity is felt abruptly by the workload when an autoscaler is not able to provision capacity (e.g. because of an account quota).

A special case of the failure to deal with shifts between unbounded and bounded capacity regimes is disaster or infrastructure outage scenarios, when available capacity falls catastrophically, often to zero. It takes time to reintroduce capacity into the underlying system, and it takes even more time to introduce workloads into that reintroduced capacity. But when capacity begins to be added again, predictive autoscalers will ignore conditions in an attempt to follow their schedule, while reactive autoscalers typically attempt to restart all workloads simultaneously due to the unanticipated change in capacity. Either behavior causes spikes utilization in a way that can cripple the system (also known as the "thundering herd problem") such that overall recovery is greatly delayed. For this reason, some organizations employ special procedures during disaster recovery that use manually assigned workload priorities, and the workloads are manually reintroduced in the order of the manually assigned workload priorities. This process, however, may cause some highly important workloads to be restarted after lower importance workloads, e.g., when the manually assigned priorities do not match users' expectations. They may also unnecessarily extend time to return to fully normal operation, because each workload needs to be fully relaunched before the next begins launching.

In addition, predictive and reactive autoscalers are focused on single workloads, meaning that overall utilization of available capacity is suboptimal. Each autoscaler makes locally-scoped decisions, but does not and cannot account for the decisions of other systems. This means that capacity may be allocated to less-important workloads ahead of more-important workloads. This is especially the case when demand for the less-important workload rises before demand for the more-important workload. Because the autoscalers make independent decisions, they have no mechanism for allowing the less-important workload to surrender capacity to the more important workload.

In addition, because such autoscalers make locally-scoped decisions, they can create cascading failure conditions where each individual autoscaler makes decisions that place pressure on other systems, causing their autoscalers to make similar decisions. For example, if one autoscalers has raised its target for a workload, this may reduce the performance of other workloads. In turn, their autoscalers may elect to raise their targets to compensate. This reinforcing feedback loop can quickly cause a runaway allocation of resources without necessarily improving performance or efficiency.

SUMMARY

This specification describes a cloud computing system having a dynamic autoscaler that can dynamically scale resources in a computing platform, particularly a cloud computing platform.

Particular embodiments of the subject matter described in this specification can be implemented so as to realize one or more of the following advantages. A cloud computing platform can use a dynamic autoscaler to overcome the drawbacks of both predictive and reactive autoscalers. In particular, the dynamic autoscaler can automatically scale up and scale down resources to achieve more predictable resource utilization, even when demands for resources fluctuate substantially throughout the planning period. Thus, unlike a predictive autoscaler, a dynamic autoscaler can automatically react to unforeseen changes in demand. And unlike a reactive autoscaler, a dynamic autoscaler can provide for a highly predictable resource utilization. The dynamic autoscaler can also automatically prioritize workloads according to user-specified capacity parameters in a way that more closely aligns with user priorities. The dynamic autoscaler also automatically handles disaster recovery processes with predictable resource utilization. In other words, the system does not need to use special disaster recovery autoscaling procedures. Rather, the dynamic autoscaler can use its normal operating procedures to gracefully recover from a disaster scenario without a crippling spike in demand or a mismatch between user priorities and the order in which workloads are restarted. The dynamic autoscaler can balance workload value against global utilization, so that an optimized allocation of workloads can be achieved without requiring central coordination between workloads. The dynamic autoscaler can provide efficient autoscaling in a way that cannot be directly replicated with technical approaches alone, e.g., with CPU thresholds, because it directly incorporates information about the value and priority of workloads. The dynamic autoscaler can be applied effectively to a wide variety of workload types, demand indicators and capacity types, e.g. CPUs or vCPUs, CPU share, RAM share, RAM bytes, IOPS, disk and storage space, containers, applications, functions, service instances, nodes, cells, workers, builds, tasks, cache share, cache entries, cache size, message bus throughput, message priority, network bandwidth, network QoS, database query workload quotas, requests per second, events per second, queue depth, records pending, and concurrent requests, to name just a few examples.

In addition, the dynamic autoscaler can be used to make decisions across multiple resource pools. For example, it may be used to make "hybrid cloud bursting" decisions, where a fixed pool of on-premises capacity is augmented by public cloud capacity when it is rational to do so. Similarly, it may be used to perform arbitrage across multiple providers, by selecting a mix of workload placement with providers that trades off lowest-cost placement with delays caused by having workload data needing to traverse multiple provider networks and the internet.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
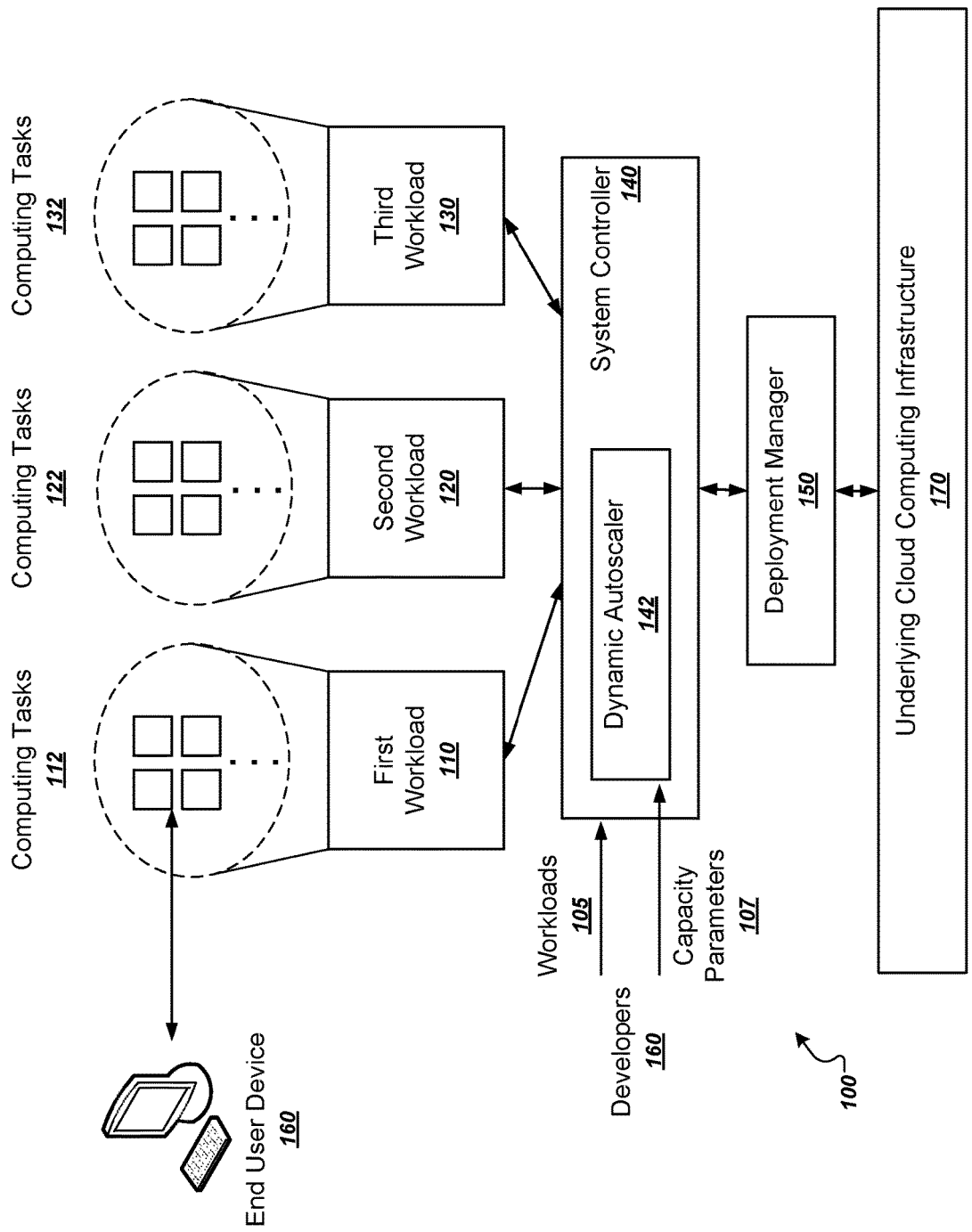
FIG. 1 illustrates an example system having a dynamic autoscaler.

FIG. 1 illustrates an example system 100 having a dynamic autoscaler 142 that automatically scales up and scales down resources in a cloud computing platform. The dynamic autoscaler 142 can be a component of a system controller 140.

The system controller 140 is a software system that can coordinate the setup and management of a cloud computing platform that hosts multiple workloads 110, 120 and 130, with each workload having one or more instances. To host workloads on the platform, the system controller 140 can make use of a deployment manager 150 that can provision appropriate resources on demand in an underlying cloud computing infrastructure 170. For example, the deployment manager 150 can be implemented using the open source systems such as BOSH or Kubernetes.

Developers 160 can provide workloads 105 to the system controller 140. The system controller can then launch one or more instances of each workload as computing tasks 112, 122, and 132. Thus, the example system 100 hosts three workloads 110, 120 and 130 provided by different developers of the system 100 on the one cloud computing platform.

The computing tasks 112, 122, and 132 can then be accessed by end user devices, e.g., end user device 160, over an appropriate communications network, e.g., the Internet. As more end users increase or decrease demands on the computing tasks 112, 122, and 132 hosted by the platform, the system controller 140 can scale up or scale down the instances of the workloads 110, 120, or 130. In some implementations, scaling may involve changing instance configurations, e.g. increasing RAM bytes, as well as, or instead of, changing the number of instances. In some implementations, the requests from end users are passed through a load balancing subsystem that routes individual user requests to particular instances of a workload. The load balancing subsystem can then report overall demand metrics to the system controller 140 so that the system controller 140 has up-to-date metrics about overall demand and the demand on various workloads in the system. In some implementations, workloads may directly report demand metrics to the system controller. In other implementations this reporting may be handled by other systems, such as a reverse proxy or a kernel module. To scale up or scale down resources, the system controller 140 can use a dynamic autoscaler 142. The dynamic autoscaler 142 is a software subsystem that can dynamically compute the levels of computing resources that should be allocated to each workload on the platform, able to take capacity parameters 107 provided by the developers as an input to its decisions. The system controller 140 can then communicate with the deployment manager 150 in order to provision appropriate resources in the underlying cloud computing infrastructure 170 according to the computations by the dynamic autoscaler 142.

For example, when demands for a workload increases, the dynamic autoscaler 142 can use the capacity parameters 107 received from a developer of the first workload 110 to determine that the system controller should provision more computing resources, e.g., virtual machines, containers, disks, and network resources, to handle the increased demand. Alternatively or in addition, the system controller can automatically scale up the number of instances of the first workload 110 that are running on the platform.

Notably, when demands for computing resources on the platform taken as a whole increase, the dynamic autoscaler 142 can also determine that resources for some workloads should be scaled down. For example, the dynamic autoscaler 142 can determine that the capacity parameters received by a developer for the second workload 120 indicate that the system controller 140 should automatically scale down computing resources for the second workload in favor of the first workload 110, even when overall demand or demand for the second workload itself is actually increasing. Thus, the system controller 140 can automatically scale down computing resources or the number of instances for the second workload 120.

The system 100 can be set up and configured by operators of an entity that maintains the system 100. These can include platform operators that maintain the cloud computing platform that hosts computing tasks 112, 122 and 132.

A dynamic autoscaler, e.g., the dynamic autoscaler 142, can be used for a variety of cloud computing platforms. For example, a cloud application platform is a type of cloud platform designed for high-productivity software development. Therefore, much of the underlying configurations and dependencies are handled automatically, e.g., using frameworks and other integrated development tools, during staging and launching of the applications. As another example, container orchestration platforms are more suited to hosting third-party, off-the-shelf software that may not have been written with development environment of the cloud platform in mind. As another example, requests per second for one workload might be throttled to retain capacity for a second workload. As another example, database queries may be allocated different processing quotas, so that user-facing interactive queries preferentially receive computing resources over long-running batch queries.

The example system 100 described in FIG. 1 using the dynamic autoscaler 142 can work with either a cloud application platform, a container orchestration platform, or both, or with a variety of other computing resources which can be allocated to distinct workloads.

Figure 2:
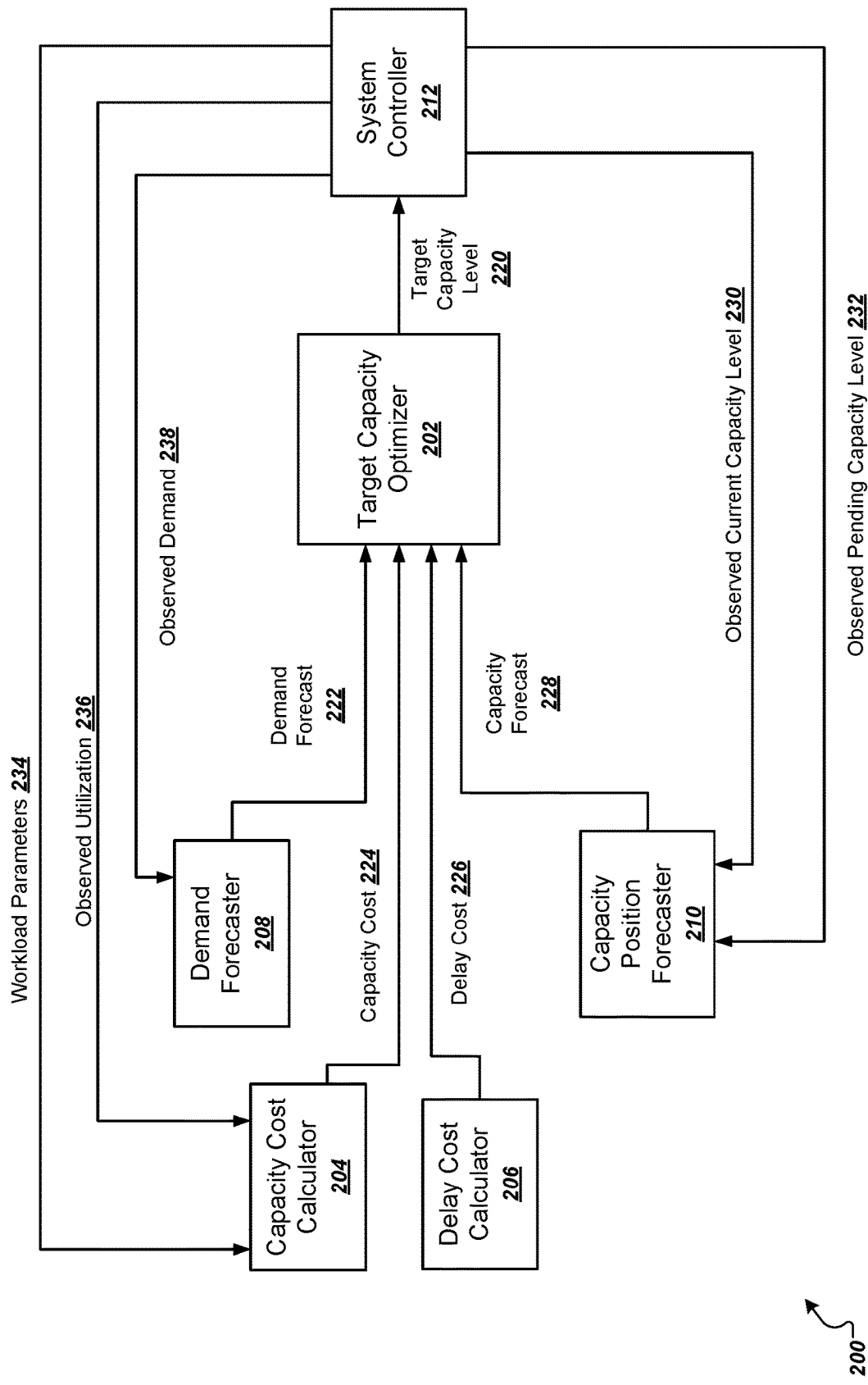
FIG. 2 is a diagram of an example dynamic autoscaler.

FIG. 2 is a diagram of an example dynamic autoscaler 200 that can dynamically autoscale resources in a cloud computing platform. The dynamic autoscaler 200 can include a target capacity optimizer 202, a capacity cost calculator 204, a delay cost calculator 206, a demand forecaster 208, and a capacity position forecaster 210.

The primary output of the autoscaler 200 is a target capacity 220, which indicates a target quantity of resources to allocate to a particular workload. Generally, the target capacity 220 is specific to a particular workload, and thus, the system can instantiate a different autoscaler for each workload in the system, or simply use the same autoscaler to repeatedly regenerate the target capacity 220 for each workload.

The target capacity optimizer 202 is a subsystem that generates the target capacity 220 for a particular workload based on one or more of the following inputs: a demand forecast 222, a capacity cost 224, a delay cost 226, a capacity forecast 228, an observed current capacity level 230, an observed pending capacity level 232, and an observed demand 238. The target capacity optimizer 202 can perform optimization over some time in the future, e.g., over the next minute, hour, day, week, month, or year, to name just a few examples. More details about the target capacity optimizer 202 will be described below with reference to FIG. 4.

The algorithms or models implemented in the target capacity optimizer 202 to perform dynamic autoscaling can be in various forms. In some implementations, if the resource supply is unconstrained, the target capacity optimizer 202 can use a cost-plus model and can generate target output based on the cost of on-demand or peak capacity.

In some other implementations, if the resource supply is constrained, the target capacity optimizer 202 can calculate a supply-constrained model. For example, if the dynamic autoscaler has full visibility of each workload's preferences, the target capacity optimizer 202 can calculate a clearing cost that can exactly balance supply and demand. As another example, the dynamic autoscaler can run "nested" with another instance of the dynamic autoscaler and can balance the global delay cost with global capacity cost of an underlying platform such as an IaaS. In this example, the dynamic capacity cost of the lower scaler can become the delay cost of the higher scaler. This scheme is repeatable at multiple levels of nesting, allowing for dynamic autoscalers to coordinate management of different "layers" of an overall system.

The target capacity 220 can be expressed in any appropriate capacity units or delta in capacity units. The dynamic autoscaler 200 can communicate the value for the units of the target capacity 220 to a system controller 212, which can use a deployment manager, e.g., the deployment manager 150 of FIG. 1, to provision or deprovision resources in an underlying cloud computing infrastructure according to the target capacity 220. For example, the target capacity for a particular workload can be a target quantity of computing tasks, processors, disk space or network bandwidth, to name just a few examples.

In some implementations, the target capacity 220 can be expressed as target capacity level that represents a portion of a maximum. The target capacity level can then be converted to capacity units through a convertor. For example, a target capacity of "the workload 110 having 70% of the available capacity" can be converted to scaled units having the meaning "the workload 110 having six computing tasks 112".

The capacity cost calculator 204 can generate a capacity cost 224 based on workload parameters 234 and an observed utilization 236. The workload parameters 234 indicate one or more quantities that the system controller 212 uses to provision resources for the workload, e.g., a number a instances, a number of processors, a number of disks, or an amount of disks or disk space, to name just a few examples.

The capacity cost 224 represents a cost of reserving resources to fulfill the workload parameters 234, given currently observed utilization 236 of the platform. In other words, the capacity cost 224 represents how expensive it is to satisfy the requested workload parameters 234 under current system conditions. If the workload asks for large amounts of computing resources and the utilization of the platform is high, the system is likely to compute a high capacity cost for that workload. On the other hand, if the utilization is low or the workload has requested small amounts of computing resources, the capacity cost is likely to be lower.

The mechanisms of the autoscaler 200 are flexible enough such that the capacity cost 224 and the resulting target capacity 220 need not represent a single unit of measure. In fact, the capacity cost 224 and the target capacity 220 can represent a bundle of different kinds of resources. For example, the capacity cost 224 can represent the cost of reserving CPU shares as well as disk space according to the workload parameters 234. The resulting target capacity 220 then represents a target level for the CPU and disk space bundle. It may be up to the system controller 212 or the individual workloads to determine how exactly to effectuate the target capacity 220 with the different kinds of workloads represented therein. In effect, the autoscaler allows global tradeoffs with local decision making on the exact levels of resources to provision.

The system can compute the capacity cost in a variety of ways. As one example, the system can use a schedule that adjusts the capacity cost according to the observed utilization 236. The system can also use more sophisticated mechanisms for computing a capacity cost from the capacity parameters and current utilization, including fuzzy rule methods, cost-plus calculators, and utilization fraction functions.

The observed utilization 236 can be the resource utilization currently measured by the system controller 212. In some implementations, the observed utilization 236 is expressed as a measurement of consumption compared to the maximum possible consumption. For example, the observed utilization can be 80% of the resources. The capacity cost calculation by the capacity cost calculator 204 can be different depending on whether that observed utilization 236 is relative to a capped or un-capped capacity.

The delay cost calculator 206 can generate a workload-specific delay cost 226. The delay cost 226 of a workload represents a cost of the delay resulting from demand for requested resources not being met with currently available capacity. The delay cost 226 can represent a user-specified measure of the penalty that will be suffered by the owner of the workload when requested resources, e.g., deployment of an instance of a workload, is not met by the available capacity. Alternatively or in addition, the delay cost can represent the cost of additionally requested resources being delayed by a particular threshold amount of time. In some implementations, the delay cost 226 is a cold start cost that represents a measure of the penalty that will be suffered by the owner of the workload when a computing resource has to be provisioned from scratch. The delay cost calculator 206 can calculate a value for the delay cost according to a user-specified constant if certain conditions occur, e.g., a cold start. The delay cost calculator 206 can also compute a dynamic value of the delay cost that varies with the amount of delay incurred. For example, a user can provide a function definition for computing an amount for the delay cost based on the amount of time required to provision an instance of the workload. This allows the delay cost calculator 206 to adjust the delay cost 226 of a workload when certain events occur, such as a total capacity outage, being mentioned by a Twitter celebrity, or a special event such as a Black Friday sale.

The demand forecaster 208 can generate a demand forecast 222 based on observed demand 238 measured by the system controller 212. The generated demand forecast 222 can be the amount of demand that is expected to occur over a particular planning horizon, e.g., a period of time, in the future. For example, the demand forecast can be a time series or can be dictated by a policy of the platform.

The capacity position forecaster 210 can generate a capacity forecast 228, which represents how the computing resources allocated to the workload is predicted to change during an upcoming time period. The capacity forecast 228 can be based on observed current capacity level 230 and observed pending capacity level 232. In some implementations, configurable inputs and variables 216 can also be the input to the capacity position forecaster 210. The observed current capacity level 230 represents the quantity of computing resources allocated to and usable by the workload, while the observed pending capacity level 232 represents pending capacity adjustments that have been requested but not yet fulfilled.

The capacity position forecaster 210 can forecast capacity based on the amount of capacity that is available currently and the amount of capacity that is pending to come online. The amount of capacity that is pending, i.e., observed pending capacity level 232, can be related to the amount of capacity that the system has requested at previous planning cycles and the amount of capacity that is expected to be allocated in the next planning cycle. The capacity position forecaster 210 can take into account both the current capacity level and the pending capacity level due to previous allocation decisions by the system. One advantage of using the capacity position forecaster 210 is that it helps to prevent the dynamic autoscaler 200 from overshooting target capacity levels or generating oscillating target capacity levels.

In some implementations, the capacity cost calculator 204 can also take into consideration other user-specified configurable inputs and variables. The configurable inputs and variables can provide alternative ways to generate the capacity cost. For example, the user can provide a cost schedule published by an IT department of an organization that describes the cost at certain time of the day for a certain type of workload, and the capacity cost calculator can directly use the cost schedule to calculate the capacity cost.

The configurable inputs can include capacity parameters that describe a set of characteristics for each workload.

The capacity parameters can include a workload lead time, which represents a user-specified estimate for the software of an instance to start up and begin functioning for the purposes of the workload. Thus, the user can tailor this value depending on what the user considers to be a fully functional state of the workload. In an alternative implementations, the lead time value might be calculated from historical data or set by a platform policy.

From the workload lead time, the system can compute a capacity lead time, which incorporates the workload lead time but also adds other lead time required to launch an instance of the workload. The capacity lead time can be based on a forecast or user-specified workload lead time that quantifies the time required for the created resources, e.g., newly created instances or disk space, to become operational or to become usable by the workload.

The capacity lead time can represent the time required to allocate already provisioned resources. In other words, the capacity lead time can represent a length of time required for the cloud computing platform to allocate, to the workload, resources that are already partly or wholly provisioned but not already allocated to the workload. Thus, for a disk, the capacity lead time can represent time to allocate, to the workload, additional disk space for a disk that is already up and running. For a software task, the capacity lead time can represent startup time for software tasks whose required files are already provisioned on disk or in memory.

Alternatively or in addition, the capacity lead time can represent a length of time required for the cloud computing platform to launch an instance of the workload in a process that is ready to execute. This can mean that the software is provisioned in memory on a computing resource as a process that is not currently schedulable but that is otherwise known to and managed by a kernel of the computing resource.

The system can automatically compute the capacity lead time because it has access to information that users would typically not have access to or be unaware of, such as information about an IaaS service level. In some implementations, the system computes the capacity lead time as a measure of the amount of time required to launch an instance of the workload on a warm node, meaning an already-provisioned computing resource.

The system can use the capacity lead time as a mechanism for dealing with uncertainty. For example, if a workload has a very long capacity lead time, the system can provision more copies of the workload to deal with the uncertainty of what happens to the demand between the time that the system decides to provision the copies and the time that the instance actually starts functioning for the purposes of the workload. Then, if demand should increase during the capacity lead time, the system will have mitigated that uncertainty by already provisioning more resources due to the long capacity lead time. As capacity becomes progressively available, the autoscaler might revise its decisions and reduce its target capacity level. Alternatively, it may turn out that demand was high and therefore the capacity should be retained.

The configurable inputs and variables can be an input to the capacity cost calculator 204, the delay cost calculator 206, the demand forecaster 208 or the capacity position forecaster 210. The configurable inputs and variables can include fixed rules, policy, tables, schedules, fuzzy rules, event-driven reactions, statistical series analysis, time series analysis, confidence band estimates, 3-point estimates, machine learning algorithms, aggregated expert opinions, etc.

The configurable inputs and variables can provide alternative ways to generate desired outputs for these calculators and forecasters. In some implementations, rather than calculating or forecasting the desired outputs based on algorithms, these calculators and forecasters can be implemented by directly using the configurable inputs and variables.

For example, rather than using an advanced fuzzy rule based algorithm, the capacity cost calculator 204 can directly use the cost schedule published by an IT department. In this example, the cost schedule published by the IT department can describe the cost at certain time of the day for a certain type of workload. As another example, the capacity position forecaster 210 might adjust its forecasts to account for the probability that some fraction of pending capacity does not become available. As another example, the capacity position forecaster 210 might take into consideration information about planned and unplanned outages.

The system controller 212 can take the actual demand as input and can output the necessary input to the various components of the dynamic autoscaler 200. The system controller 212 can output observed current capacity level 230, observed pending capacity level 232, observed utilization 236, observed demand 238, and workload parameters 234.

Figure 3:
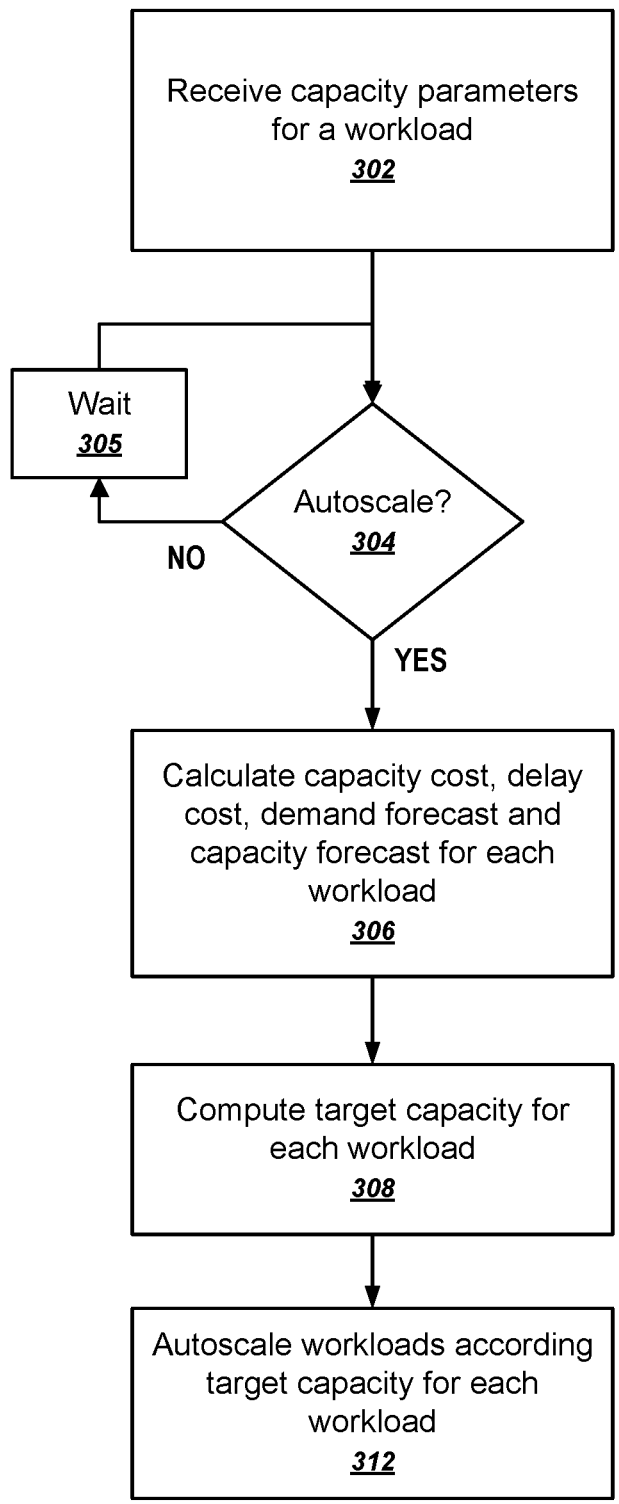
FIG. 3 is a flowchart of an example process for automatically scaling resources in a cloud computing platform using a dynamic autoscaler.

FIG. 3 is a flowchart of an example process for automatically scaling resources in a cloud computing platform using a dynamic autoscaler. For convenience, the process will be described as being performed by a system of one or more computers and programmed appropriately in accordance with this specification. For example, the dynamic autoscaler 142 in the system 100 of FIG. 1, appropriately programmed can perform the example process.

The system receives capacity parameters, for a particular workload (302). The capacity parameters are generally user-specified parameters provided by the owner of the workload, e.g., by developers who authored the software executing in the workload. As described above, the capacity parameters can include parameters that describe a set of characteristics for each workload. For example, capacity parameters can include a delay cost and a capacity cost.

The system can also consider other inputs, for example, observed parameters of the system. The observed parameters can be system parameters observed by the dynamic autoscaler or another system. The observed parameters can include observed utilization, observed demand, observed current capacity level and observed pending capacity level.

The configurable inputs and variables can include fixed rules, policy, tables, schedules, fuzzy rules, event-driven reactions, statistics series analysis, time series analysis, confidence band estimates, 3-point estimates, machine learning algorithms, aggregated expert opinions, etc.

The system determines whether to rescale the workloads running in the cloud computing platform (304). The system can for example perform periodic autoscaling. For example, the need to rescale can be scheduled regularly every few days. Alternatively, autoscaling can be scheduled every few seconds, minutes or hours in a more constant pattern. In some implementations, autoscaling can be triggered by another mechanism in the system. For example, the event of a new urgent workload can trigger autoscaling of current workloads in the system. In some implementations, the autoscaler or another system might adjust the recalculation time based on parameters. For example, when utilization is low, the autoscaler may need to run less frequently.

In response to determining that the system does not need to rescale the workloads, the system can wait for a certain condition (305) and then perform the decision again. For example, the condition can be a certain period of time has passed in a periodically scheduled autoscaling situation.

In response to determining that the workloads need to be rescaled, the system performs an autoscaling process (branch to 306).

The system calculates a capacity cost, a delay cost, a demand forecast, and a capacity forecast for each workload (306). As described above, the system can calculate these values by its capacity cost calculator, delay cost calculator, demand forecaster, and capacity position forecaster based on the capacity parameters, observed parameters, and configurable inputs and variables.

The system computes the target capacity for each workload (308). As discussed above, the target capacity calculator in the dynamic autoscaler can compute target capacity based on capacity cost, delay cost, demand forecast, and capacity forecast for each workload. The dynamic autoscaling process and current capacity parameters of the various workloads encourages low-value workloads to migrate to periods of low demand, possibly to make way for higher-value workloads.

The system autoscales workloads according to the target capacity for each workload (312). As described above, the dynamic autoscaler can communicate the desired target capacity for each workload to the deployment manger. The deployment manager can adjust resource allocations in the underlying cloud computing infrastructure for each workload. Thus, as the cost for the resources varies, the dynamic autoscaler can scale the workloads up and down automatically.

As described above, the autoscaler can perform autoscaling for multiple workloads even when each workload has different respective delay costs, capacity forecasts, capacity lead times, demand forecasts, or observed demands. As one example, system can scale down resources for a workload when the workload has a lower target service level or a lower delay cost than other workloads on the cloud computing platform. As another example, the system can scale up resources for a workload when the workload has a higher target service level or a higher delay cost than other workloads on the cloud computing platform.

However, because the autoscaler can trade off the parameters of multiple workloads against each other concurrently, there is not necessarily a strict correlation between demand and the target capacity for each workloads. In fact, the autoscaler might scale down resources for a workload even when the total demand for computing resources across all workloads increases. Conversely, the autoscaler might scale up resources for a workload even when the total demand across all workloads decreases.

Figure 4:
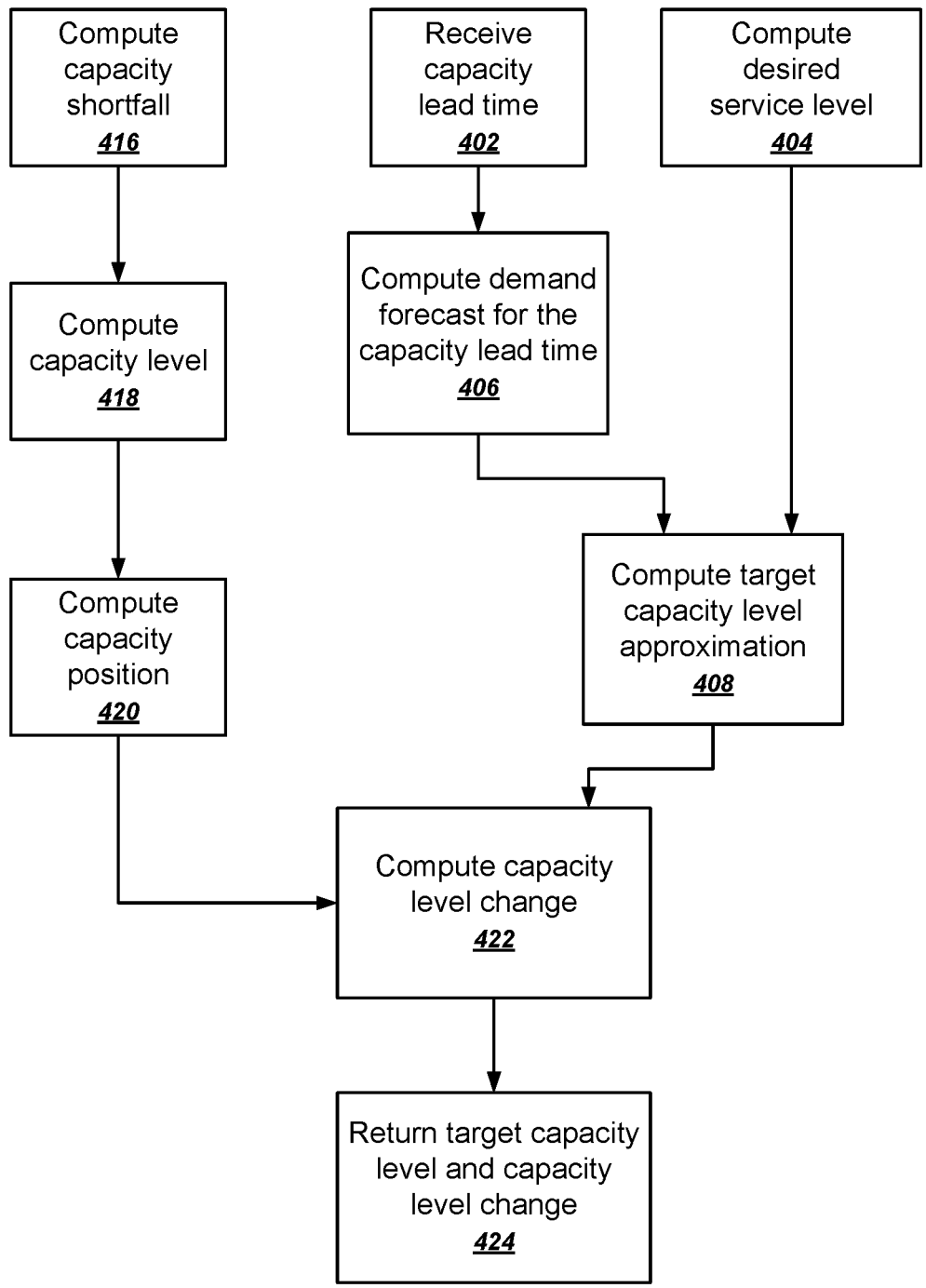
FIG. 4 is a flowchart of an example process for performing optimization and generating a target capacity level using a target capacity optimizer.

In addition, the autoscaler can provide more useful information about its inputs and decisions. For example, the users of the services provided by the cloud computing platform can gain greater visibility into decisions in terms of end-user and developer values, e.g. cost of delay, instead of as purely engineering values, e.g. delay in seconds. FIG. 4 is a flowchart of an example process for performing target capacity optimization and generating a target capacity level using a target capacity optimizer. For convenience, the process will be described as being performed by a system of one or more computers programmed appropriately in accordance with this specification. For example, the target capacity optimizer 202 in the dynamic autoscaler 200 of FIG. 2, appropriately programmed can perform the example process.

The system can take as inputs a capacity forecast, a demand forecast, a capacity cost, a delay cost, an observed current capacity level, an observed pending capacity level, and an observed demand. The target capacity optimizer can perform target capacity optimization over a period of time in the future. The target capacity optimizer can output target capacity level and capacity level change.

The system receives a capacity lead time (402). As described above, the capacity lead time can represent the predicted amount of time required to launch an instance of a workload on an already-provisioned computing resource, e.g., on a warm node. Capacity forecasts can take into account details of the detailed nature of already-provisioned resources. For example, it may forecast shorter lead times when a container image is available on the disk of many compute nodes, because this will avoid delays due to downloading the container image before launching it. Similarly, it might adjust the forecast downwards if the image is present in memory or if the container has been launched as a process but is currently "frozen". It might also calculate longer lead times if network traffic, disk activity or other shared resource usage is higher.

In cases where the capacity forecast is for adjustments in resource allocation, the capacity position forecaster 210 can account for the particular details of how the managed system works. For example, a capacity forecast for adding Kafka broker nodes may include calculations of time needed to rebalance partitions. As another example, a capacity forecast of an increase of cache share for one workload may need to account for time needed to free space by deleting the cache items inserted by a second workload. In another example, the capacity forecast for increasing disk IOPS will need to account for time required for current IOPS to be completed.

The capacity lead time can include, as a component, a user-specified workload lead time.

The system computes a desired service level (404). The desired service level represents a tradeoff between delay cost and capacity cost, expressed as the probability that a particular demand (e.g. a network request) will be immediately served from available capacity (e.g. an idle instance). Thus, the desired service level should be higher when delay cost is higher and lower when capacity cost is higher. In some implementations, the system computes the desired service level according to.

$$\text{Desired Service Level} = \frac{\text{Delay Cost}}{\text{Capacity Cost} + \text{Delay Cost}}.$$

The system calculates a demand forecast for the capacity lead time based on the capacity lead time and a demand forecast received by the system (406). The demand forecast for the capacity lead time represents an estimated amount of demand that can happen over the period of time defined by the capacity lead time. For example, if the capacity lead time is five minutes, the system can use a demand forecaster to compute a forecast for demand over the upcoming five minutes, or might extract a five minute slice from a longer forecast.

The system calculates a target capacity level based on the demand forecast for the capacity lead time and the desired service level (408). The target capacity level represents the amount of resources that the system should allocate for the workload over the planning period.

The system can compute the target capacity level according to statistical or machine learning techniques to generate a value that is likely to meet the forecasted demand according to a particular probability. In some implementations, the particular probability is given by the desired service level computed above with reference to step 404. The target capacity level can be calculated based on statistical distribution models having a mean and a standard deviation, time series predictions, machine learning algorithms, confidence band estimates, or 3-point estimates, just to name a few examples.

For example, assuming the demand is normally distributed in the planning period, the system can calculate a Z-score of the target capacity level according to:

Z of Target Level=Normal Distribution Quantile (Desired Service Level).

Let the mean of the demand forecasted for the capacity lead time be $\mu$, and the standard deviation of the demand forecasted for the capacity lead time be $\sigma$. The system can then compute the target capacity level according to:

Target Capacity Level=$\mu$+(Z of Target level×$\sigma$).

In some implementations, the system rounds the target capacity level to whole unit. In other words, instead of computing a target capacity level as a real number value, the system can instead compute a target capacity level that is an integer value that represents an amount of computing resources in whole units. For example, after rounding the target capacity level can be 3 virtual machines instead of 2.75 virtual machines.

The system calculates a capacity shortfall based on an observed current capacity level and an observed demand (416). The capacity shortfall represents an amount of deficiency in the observed current capacity level compared with the observed demand. In some implementations, capacity shortfall can be the difference between the observed current capacity level and the observed demand according to:

Capacity Shortfall=Observed Current Capacity Level−Observed Demand.

In some implementations, the system determines whether the observed current capacity level and the observed demand are in the same units. If the observed current capacity level and the observed demand are not in the same units, the target capacity optimizer maps the observed demand to the units that the observed current capacity level is in before calculating the capacity shortfall.

The system calculates a capacity level based on the observed current capacity level and the capacity shortfall (418). The capacity can represent the level of capacity after accounting for capacity that is needed to meet demand during the current planning cycle, according to:

Capacity Level=Observed Current Capacity Level−Capacity Shortfall

The system calculates a capacity position based on an observed pending capacity level and the capacity level (420). The capacity position can represent the level of capacity expected in the next planning cycle. In some implementations, capacity position can be the sum of capacity level and observed pending capacity level, according to:

Capacity Position=Capacity Level−Observed Pending Capacity Level

The capacity position effectively combines the observed pending capacity level, the observed current capacity level and the observed demand into one measurement.

The system compares the target capacity level to the capacity position and outputs a capacity level change (422), according to:

Capacity Level Change=Target Capacity Level−Capacity Position

As discussed above, the target capacity level can represent the capacity level required over the period of time planned. The capacity position can represent the capacity level that is available over the period of time planned. If the capacity position is above the target capacity level, the dynamic autoscaler may not need to make changes, or may decide to scale down the computing resources. If the capacity position is below the target capacity level, the dynamic autoscaler may request to scale up the computing resources.

Finally, the system returns the target capacity level and the capacity level change (424) to a system controller. The system controller can then use a deployment manager to provision or deprovision resources in an underlying cloud computing infrastructure according to the target capacity level and the capacity level change.

Figure 5A:
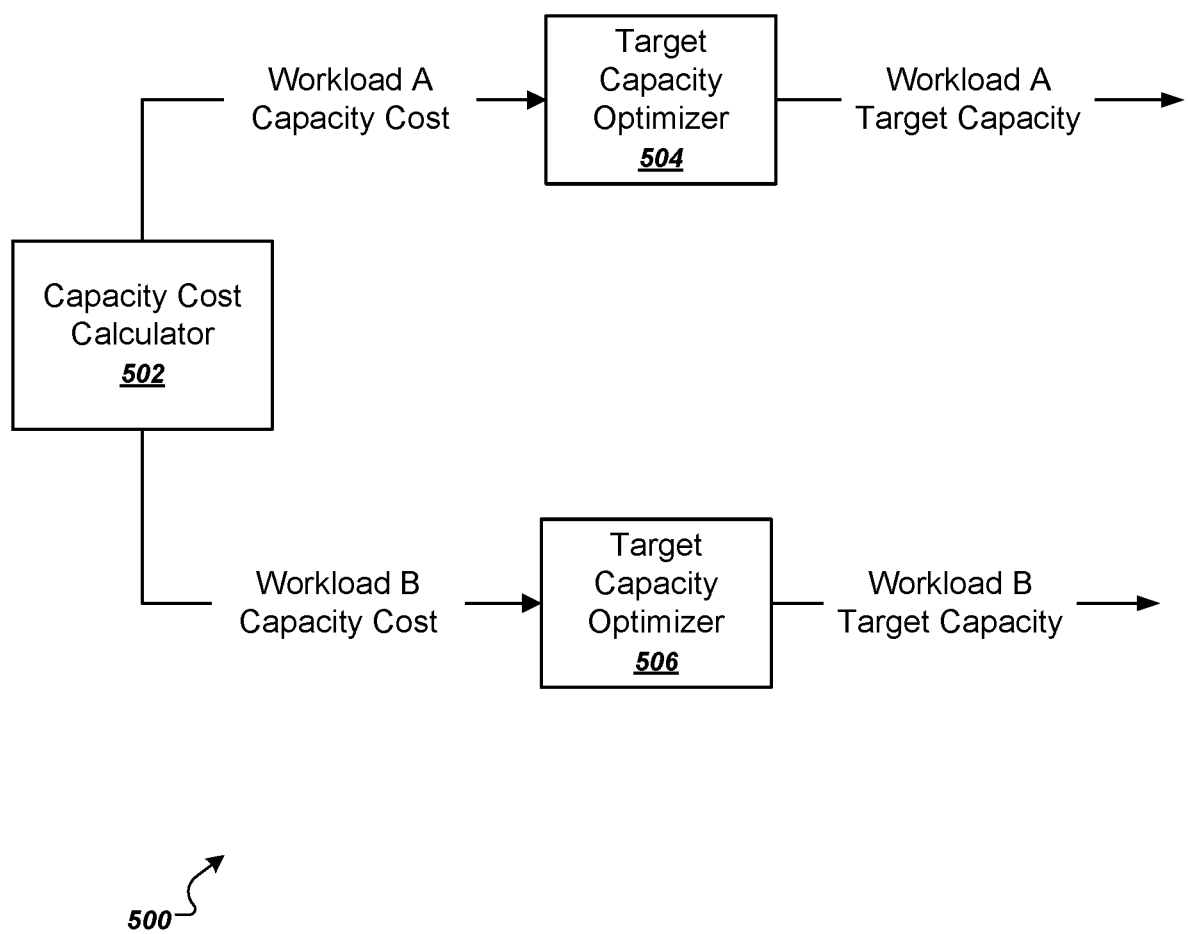
FIG. 5A is a diagram of an example system having a dynamic autoscaler that dynamically autoscales computing resources for two workloads.

FIG. 5A is a diagram of an example system having a dynamic autoscaler 500 that dynamically autoscales computing resources for two workloads. The dynamic autoscaler can perform the autoscaling process for multiple workloads, with each workload having a different respective delay cost, capacity forecast, capacity lead time, demand forecast, or observed demand. The two workloads in FIG. 5A are a workload A and a workload B. Each workload can have its own dynamic autoscaler that can calculate a target capacity for the each of the corresponding workloads.

As shown in FIG. 5A, the capacity cost calculator 502 can be shared between the workload A and the workload B. The capacity cost calculator 502 can cause the autoscalers of workload A and workload B to scale up and down resources based on a global capacity cost. For example, the capacity cost calculator 502 can calculate a capacity cost for the workload A and a capacity cost for the workload B based on a global capacity cost.

The system can then calculate a target capacity for each workload based on its corresponding capacity cost. The system can instantiate a different target capacity optimizer for each workload in the system. For example, as shown in FIG. 5A, the system can instantiate a target capacity optimizer 504 for the workload A and a target capacity optimizer 506 for the workload B. Alternatively, the system can simply use the same target capacity optimizer to generate the target capacity for each workload.

This means that the capacity cost calculator 502 can cause efficient autoscaling of many workloads, without itself needing to make any autoscaling decisions. Global efficiency is improved without needing to maintain global state or solve a global scaling problem.

Figure 5B:
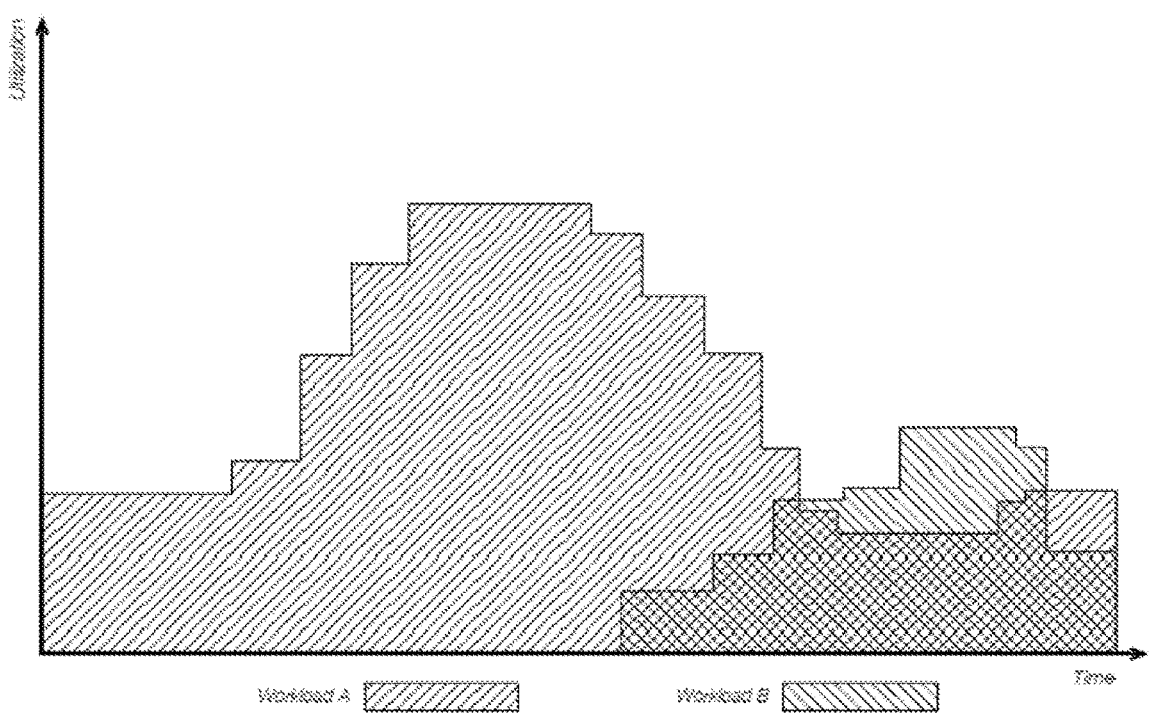
FIG. 5B is an example of the dynamic autoscaling process by a dynamic autoscaler in FIG. 5A when two workloads have normal contention for fixed resources.
Figure 5C:
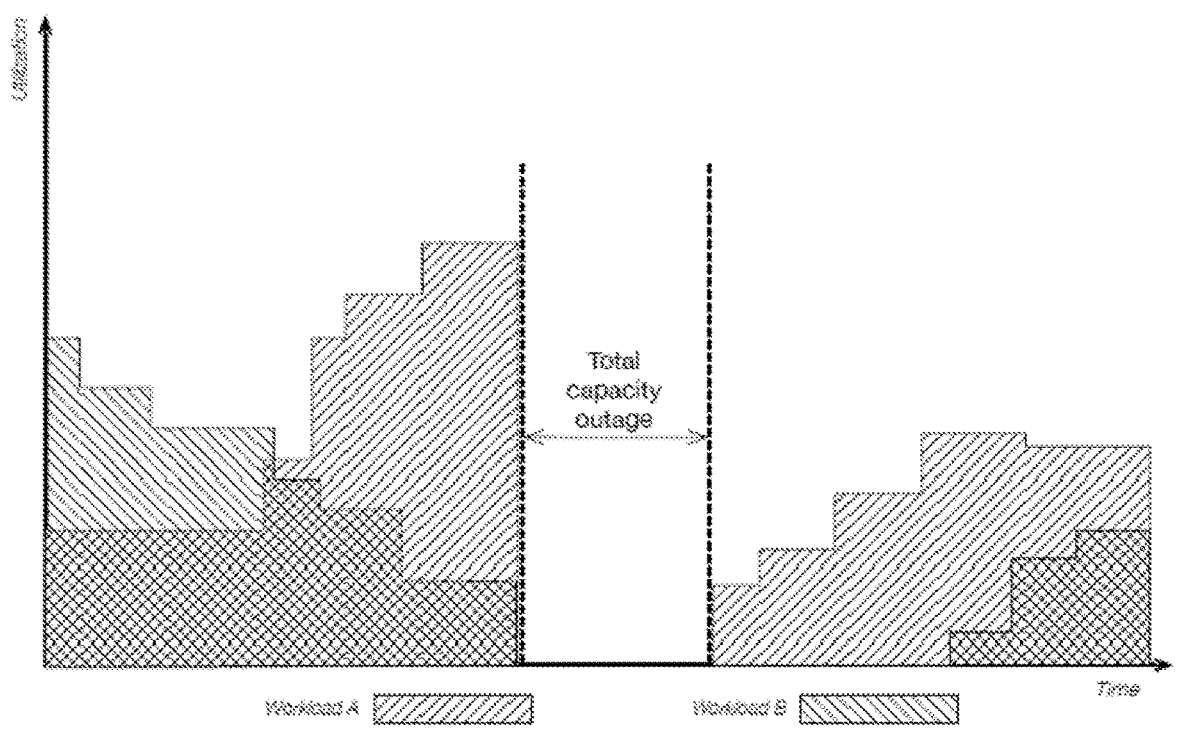
FIG. 5C is an example of the dynamic autoscaling process by a dynamic autoscaler in FIG. 5A when the two workloads encounter an outage and a subsequent disaster recovery.

The same dynamic autoscaler 500 can operate for different external situation in FIG. 5B and FIG. 5C. FIG. 5B is an example of the dynamic autoscaling process by a dynamic autoscaler 500 in FIG. 5A when two workloads have normal contention for fixed resources.

In FIG. 5B, the dynamic autoscaler 500 autoscales resources for workloads based on capacity parameters. In this example, workload A can have a high delay cost and workload B can have a low delay cost. For example, workload B can be a batch workload. The cost for the resource can vary throughout the day due to daily demand cycles.

The capacity cost calculator 502 can take into account the combined utilization of workload A and workload B and can output corresponding capacity cost to workload A and workload B respectively. Because of its higher delay cost, the target capacity optimizer 504 in FIG. 5A will decide to retain more capacity for workload A throughout the entire period, which in turn raises global utilization, in turn causing the shared capacity cost calculator 502 to raise the calculated cost. Because workload B has a lower cost of delay, its target capacity optimizer 506 sets different target capacity levels. The combined effect of this interaction and cost changes is to delay workload B from running until the workload A releases most of the resources workload A requires. Workload B may not be always on and can scale up and down throughout the day.

In some implementations, the example shown in FIG. 5B can also be affected by the demand for each workload throughout the day. For example, if the demand for workload A goes up, the dynamic autoscaler 500 can scale up resources for workload A because the dynamic autoscaler can forecast that the capacity for workload A may not be sufficient to meet the demand. If the demand changes, the dynamic autoscaler 500 can adjust the calculation of the target capacity.

FIG. 5B illustrates an example of a normal contention situation for fixed resources with two workloads. For a pool of many workloads, dynamic autoscalers connected through shared cost calculators can generate smooth resource utilization and can result in near constant or predictable resource cost and utilization cost.

For example, for a system that has 10 different workloads with different capacity parameters, the dynamic autoscaler can progressively produce a smooth utilization of resources. Because the cost of computing resources may vary throughout the day, the effect of dynamic autoscaler decisions can be to encourage and discourage workloads to start at certain time or hold off for a period of time. In this way, the utilization of resources can stay close to a predictable level. As one example, if utilization of a workload with very high delay costs begins to decline, the system can increase utilization of other workloads having lower delay costs in order to smooth out the total resource utilization. This process can be performed by the shared capacity cost calculator 502 in the dynamic autoscaler 500 in FIG. 5A.

FIG. 5C is an example of the dynamic autoscaling process by a dynamic autoscaler in FIG. 5A when the two workloads encounter an outage and a subsequent disaster recovery process. The dynamic autoscaler 500 can also be used in dramatically changing circumstances, for example, a disaster recovery scenario. When a disaster happens, such as a power outage, the system can suffer 100% capacity loss. The cost for the resource can go to the maximum or capped value. To recover from disaster, the cloud computing system may need time to reintroduce capacity. Additionally, the cloud computing system may need time to reintroduce workloads to capacity that is available.

In a disaster recovery scenario, the available capacity to reintroduce workloads can be much smaller than what the system would exhibit under normal conditions.

The dynamic autoscaler 500 in FIG. 5A can rationally allocate resources and can reintroduce workloads based on capacity parameters. As shown in FIG. 5C, the dynamic autoscaler can identify workload A as the first priority workload. When enough capacity has been allocated to workload A, the dynamic autoscaler 500 can start to reintroduce workload B alongside workload A, without needing to wait for Workload A to finish fully reloading. The dynamic autoscaler can optimize both the time and amount of resources for recovering multiple workloads in a cloud computing system.

In some implementations, if a high value workload has high delay cost, the dynamic autoscaler can raise the capacity cost calculated by the capacity cost calculator 502. The dynamic autoscaler can encourage a low value workload to hold off such that the high value workload can take over capacity from the low value workload.

In various other implementations, a capacity cost calculator, e.g., the capacity cost calculator 502, may have access to multiple resource pools (e.g. different cloud platform providers, also known as "multi-cloud") and a deployment manager may also have access to the same multiple resource pools. Delay cost calculators, e.g., delay cost calculator 206 of FIG. 2, can include network transmission time in their calculations. The dynamic autoscaler can then tradeoff between data locality and lowest-cost, effectively performing arbitrage between the providers. Sometimes the multiple resource pools will be a mix of fixed pools directly owned and controlled ("on-premise") and resources requested on-demand from an external service ("public cloud"), in a combination sometimes called "hybrid cloud". The same calculations can be used to intelligently "burst" workloads into public clouds, selecting the most valuable workloads to be scaled beyond the fixed pool into the more-expensive public cloud on-demand pool.

In some implementations, observed utilization and observed current capacity may be aggregate metrics, combining a number of other units into a single measurement. For example, an aggregate metric unit might include RAM bytes, CPU share and network bandwidth into a single measurement. The capacity cost calculator could calculate costs for the aggregate unit either as a single unit, or it might calculate the component costs and recombine them. In the case where component costs are calculated separately, the dynamic autoscaler can cause a balancing between different kinds of resources, for example causing some workloads to surrender RAM bytes to other workloads but to retain their current CPU shares.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving, by an autoscaler of a cloud computing platform, a plurality of capacity parameters for a workload that is to be executed in one or more instances of the cloud computing platform or to consume some amount or fraction of computing resources; and repeatedly performing an autoscaling process comprising:

computing a capacity cost for a workload based on a current utilization measure for multiple workloads of the cloud computing platform;

computing a delay cost for the workload and a capacity lead time for the workload, wherein the capacity lead time represents an expected amount of time to allocate additional resources to the workload;

computing a target service level for the workload based on the delay cost and the capacity cost;

computing a demand forecast for the workload;

computing a target capacity level that quantifies the amount or fraction of computing resources that should be allocated to the workload to achieve the target service level for the computed demand forecast; and automatically adjusting resource allocation for the workload according to the target capacity level.

Embodiment 2 is the method of embodiment 1, wherein the target service level represents a ratio of the delay cost to a sum of the capacity cost and the delay cost.

Embodiment 3 is the method of any one of embodiments 1-2, wherein the delay cost represents a cost of the delay resulting from demand not being met with currently available capacity.

Embodiment 4 is the method of any one of embodiments 1-3, wherein the capacity lead time is based on a forecast or user-specified workload lead time that quantifies the time required for the created resources to become operational or to become usable by the workload.

Embodiment 5 is the method of any one of embodiments 1-4, wherein the capacity lead time represents an expected amount of time to launch another instance of the workload.

Embodiment 6 is the method of any one of embodiments 1-5, wherein the capacity lead time represents a length of time required for the cloud computing platform allocate to the workload resources which are already partly or wholly provisioned without having been allocated to the workload.

Embodiment 7 is the method of embodiment 6, wherein the capacity lead time represents a length of time required for the cloud computing platform to launch an instance of the workload on a computing resource where the software is already provisioned on disk.

Embodiment 8 is the method of embodiment 6, wherein the capacity lead time represents a length of time required for the cloud computing platform to launch an instance of the workload on a computing resource where the software is already provisioned in memory.

Embodiment 9 is the method of embodiment 8, wherein the capacity lead time represents a length of time required for the cloud computing platform to launch an instance of the workload on a computing resource where the software is already provisioned in memory as a process that is not currently schedulable but that is otherwise known to and managed by a kernel of the computing resource.

Embodiment 10 is the method of any one of embodiments 1-9, wherein computing the target capacity level comprises:

computing a demand forecast for the capacity lead time; and computing a target capacity level to achieve the target service level according to the demand forecast for the capacity lead time.

Embodiment 11 is the method of any one of embodiments 1-10, further comprising performing the autoscaling process for multiple workloads, with each workload having a different respective delay cost, capacity forecast, capacity lead time, demand forecast, or observed demand.

Embodiment 12 is the method of any one of embodiments 1-11, wherein performing the autoscaling process comprises automatically scaling down resources for the computing workload.

Embodiment 13 is the method of embodiment 12, wherein automatically scaling down resources for the computing workload comprises automatically scaling down the workload when the workload has a lower target service level or a lower delay cost than other workloads on the cloud computing platform.

Embodiment 14 is the method of any one of embodiments 1-13, wherein performing the autoscaling process comprises automatically scaling down resources for the computing workload when the total demand for computing resources across all workloads increases.

Embodiment 15 is the method of any one of embodiments 1-14, wherein performing the autoscaling process comprises automatically scaling up resources for the computing workload.

Embodiment 16 is the method of embodiment 15, wherein automatically scaling up resources for the computing workload comprises automatically scaling up the workload when the workload has a higher target service level or a higher delay cost than other workloads on the cloud computing platform.

Embodiment 17 is the method of any one of embodiments 1-16, wherein performing the autoscaling process comprises automatically scaling resources for the computing workload when the total demand for computing resources across all workloads decreases.

Embodiment 18 is a system comprising: a plurality of computers and one or more storage devices storing instructions that are operable, when executed by the one or more computers, to cause the one or more computers to perform the method of any one of embodiments 1-17.

Embodiment 19 a computer storage medium encoded with a computer program, the program comprising instructions that are operable, when executed by a plurality of computers, to cause the plurality of computers to perform the method of any one of embodiments 1-17.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a distributed computing system comprising a plurality of computers, the method comprising:
   receiving, by an autoscaler of a cloud computing platform, a plurality of capacity parameters for a workload that is to be executed in one or more instances of the cloud computing platform or to consume an amount of computing resources; and
   repeatedly performing an autoscaling process comprising:
      computing a capacity cost for the workload based on a current utilization measure for multiple workloads of the cloud computing platform;
      computing a delay cost for the workload and a capacity lead time for the workload, wherein the capacity lead time represents an expected amount of time to allocate additional resources to the workload;
      computing a target service level representing a likelihood that a demand can be served from available capacity for the workload based on the delay cost and the capacity cost;
      computing a demand forecast for the workload;
      computing a target capacity level that quantifies the amount of computing resources that should be allocated to the workload to achieve the target service level for the computed demand forecast; and
      increasing resource allocation for the workload according to the target capacity level, and decreasing resource allocation for other workloads.

2. The method of claim 1, wherein the target service level represents a ratio of the delay cost to a sum of the capacity cost and the delay cost.

3. The method of claim 1, wherein the delay cost represents a cost of a delay resulting from demand not being met with currently available capacity.

4. The method of claim 1, wherein the capacity lead time is based on a forecast or user-specified workload lead time that quantifies the time required for the allocated resources to become operational or to become usable by the workload.

5. The method of claim 1, wherein the capacity lead time represents an expected amount of time to launch another instance of the workload.

6. The method of claim 1, wherein the capacity lead time represents a length of time required for the cloud computing platform allocate to the workload resources which are already partly or wholly provisioned without having been allocated to the workload.

7. The method of claim 6, wherein the capacity lead time represents a length of time required for the cloud computing platform to launch an instance of the workload on a computing resource where a software is already provisioned on disk.

8. The method of claim 6, wherein the capacity lead time represents a length of time required for the cloud computing platform to launch an instance of the workload on a computing resource where a software is already provisioned in memory.

9. The method of claim 8, wherein the capacity lead time represents a length of time required for the cloud computing platform to launch an instance of the workload on a computing resource where the software is already provisioned in memory as a process that is not currently schedulable but that is otherwise known to and managed by a kernel of the computing resource.

10. The method of claim 1, wherein computing the target capacity level comprises:
    computing a demand forecast for the capacity lead time; and
    computing a target capacity level to achieve the target service level according to the demand forecast for the capacity lead time.

11. The method of claim 1, further comprising performing the autoscaling process for multiple workloads, with each workload having a different respective delay cost, capacity forecast, capacity lead time, demand forecast, or observed demand.

12. The method of claim 1, wherein performing the autoscaling process comprises automatically scaling down resources for the workload.

13. The method of claim 12, wherein automatically scaling down the resources for the workload comprises automatically scaling down the workload when the workload has a lower target service level or a lower delay cost than the other workloads on the cloud computing platform.

14. The method of claim 1, wherein performing the autoscaling process comprises automatically scaling down resources for the workload when a total demand for computing resources across all workloads increases.

15. The method of claim 1, wherein performing the autoscaling process comprises automatically scaling up resources for the workload.

16. The method of claim 15, wherein automatically scaling up the resources for the workload comprises automatically scaling up the workload when the workload has a higher target service level or a higher delay cost than the other workloads on the cloud computing platform.

17. The method of claim 1, wherein performing the autoscaling process comprises automatically scaling up resources for the workload when a total demand for computing resources across all workloads decreases.

18. A distributed computing system comprising a plurality of computers and one or more storage devices storing instructions that are operable, when executed by the plurality of computers, to cause the plurality of computers perform operations comprising:
    receiving, by an autoscaler of a cloud computing platform, a plurality of capacity parameters for a workload that is to be executed in one or more instances of the cloud computing platform or to consume an amount of computing resources; and
    repeatedly performing an autoscaling process comprising:
       computing a capacity cost for the workload based on a current utilization measure for multiple workloads of the cloud computing platform;
       computing a delay cost for the workload and a capacity lead time for the workload, wherein the capacity lead time represents an expected amount of time to allocate additional resources to the workload;

computing a target service level representing a likelihood that a demand can be served from available capacity for the workload based on the delay cost and the capacity cost;

computing a demand forecast for the workload;

computing a target capacity level that quantifies the amount of computing resources that should be allocated to the workload to achieve the target service level for the computed demand forecast; and increasing resource allocation for the workload according to the target capacity level, and decreasing resource allocation for other workloads.

19. The system of claim 18, wherein the capacity lead time represents a length of time required for the cloud computing platform allocate to the workload resources which are already partly or wholly provisioned without having been allocated to the workload.

20. One or more non-transitory computer storage media encoded with computer program instructions that when executed by a distributed system comprising a plurality of computers cause the plurality of computers to perform operations comprising:

receiving, by an autoscaler of a cloud computing platform, a plurality of capacity parameters for a workload that is to be executed in one or more instances of the cloud computing platform or to consume an amount of computing resources; and repeatedly performing an autoscaling process comprising:

computing a capacity cost for the workload based on a current utilization measure for multiple workloads of the cloud computing platform;

computing a delay cost for the workload and a capacity lead time for the workload, wherein the capacity lead time represents an expected amount of time to allocate additional resources to the workload;

computing a target service level representing a likelihood that a demand can be served from available capacity for the workload based on the delay cost and the capacity cost;

computing a demand forecast for the workload;

computing a target capacity level that quantifies the amount of computing resources that should be allocated to the workload to achieve the target service level for the computed demand forecast; and increasing resource allocation for the workload according to the target capacity level, and decreasing resource allocation for other workloads.

* * * * *